(12) United States Patent
Ghosh et al.

(10) Patent No.: US 8,949,160 B2
(45) Date of Patent: Feb. 3, 2015

(54) SYSTEMS AND METHODS FOR GENERATING WIND POWER SCENARIOS FOR WIND-POWER-INTEGRATED STOCHASTIC UNIT COMMITMENT PROBLEMS

(75) Inventors: Soumyadip Ghosh, Peekskill, NY (US); Jayant R. Kalagnanam, Tarrytown, NY (US); Ali Koc, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 13/414,122

(22) Filed: Mar. 7, 2012

(65) Prior Publication Data

US 2013/0238530 A1    Sep. 12, 2013

(51) Int. Cl.
*G06F 15/18*  (2006.01)
*G06N 5/04*   (2006.01)
*G06N 7/00*   (2006.01)

(52) U.S. Cl.
CPC ... *G06N 5/04* (2013.01); *G06N 7/00* (2013.01)
USPC .......................................................... 706/12

(58) Field of Classification Search
CPC ............................. G06N 7/00; G06Q 10/06375
See application file for complete search history.

(56) References Cited

U.S. PATENT DOCUMENTS

| 6,021,402 | A * | 2/2000 | Takriti ........................... 705/412 |
| 2006/0089864 | A1 | 4/2006 | Feng et al. |
| 2012/0122505 | A1 | 5/2012 | Dotzler et al. |

OTHER PUBLICATIONS

Kaut "Scenario tree generation for stochastic programming: Cases from finance", doctoral thesis, 2003, pp. 140.*
Ruiz et al. "Applying Stochastic Programming to the Unit Commitment Problem", PMAPS 2008, pp. 6.*
Sahinidis, N.V., "Optimization under uncertainty: state-of-the-art and opportunities", Computers and Chemical Engineering, Jun. 2004, vol. 28, Issue 6-7, pp. 971-983.
Dupacova, J., et al., "Scenario reduction in stochastic programing: An approach using probability metrics", Mathematical Programing, 2003, vol. 511, Issue 3, pp. 493-511.
Dillon, T., et al., "Integer programming approach to the problem of optimal unit commitment with probabilistic reserve determination", IEEE Transactions Power Systems, Nov. 1978, pp. 2154-2166.
Saneifard, S., et al., "A fuzzy logic approach to unit commitment", IEEE Transactions on Power Systems, May 1997, vol. 12, Issue 2, pp. 0885-8950.
Mantawy, A. H., et al., "Integrating genetic algorithms, tabu search and simulated annealing for the unit commitment problem," IEEE Transactions Power Systems, Aug. 1999, vol. 14, Issue 3, pp. 829-836.
Huang, S.J., "Enhancement of hydroelectric generation scheduling using ant colony system based optimization approaches", IEEE Transactions on Energy Conservation, Sep. 2001, vol. 16, No. 3, pp. 296-301.

(Continued)

*Primary Examiner* — Li-Wu Chang
(74) *Attorney, Agent, or Firm* — Scully, Scott, Murphy & Presser, P.C.; Daniel P. Morris, Esq.

(57) ABSTRACT

The present disclosure relates generally to systematic algorithms (and associated systems and methods) that take a forecast model as input and produce a discrete probability distribution as output, using scenario reduction ideas from stochastic programming. In one example, an algorithm (and associated system and method) creates scenarios sequentially for each time period, leading to a scenario tree.

22 Claims, 4 Drawing Sheets

(56) References Cited

OTHER PUBLICATIONS

Sheble, G.B., et al., "Unit commitment—Literature synopsis", IEEE Transactions on Power Systems, Feb. 1994, vol. 9, Issue 1, pp. 128-135.

Padhy, N. P., "Unit commitment—A bibliographical survey", IEEE Transactions on Power Systems, May 2004, vol. 19, Issue 2, pp. 1196-1205.

Wood, A. J., et al., "Power Generation Operation and Control", Wiley-Interscience, Jan. 1996.

Lulli, G., et al., "A branch-and-price algorithm for multistage stochastic integer programming with application to stochastic batch-sizing problems", Management Science, Jun. 2004, vol. 50, No. 6, pp. 786-796.

Takriti, S., et al., "Incorporating fuel constraints and electricity spot prices into the stochastic unit commitment problem", Operations Research, Mar.-Apr. 2000, vol. 48, No. 2, pp. 268-280.

Singh, K. J., et al., "Dantzig-wolfe decomposition for solving multistage stochastic capacity-planning problems. Operations Research", Sep.-Oct. 2009, vol. 57, No. 5, pp. 1271-1286.

Ljubic, I., "A Branch-Price-and-Cut Algorithm for Vertex-Biconnectivity Augmentation", Networks, Oct. 2010, vol. 56, Issue 3, pp. 169-182.

Heitsch, H., et al., "Scenario Reduction Algorithms in Stochastic Programming", Computational Optimization Applications, Feb.-Mar. 2003, vol. 24, Issue 2-3, pp. 1-21.

Growe-Kuska, N., et al., "Stochastic Unit Commitment in Hydrothermal Power Production Planning", Applications of Stochastic Programming, 2005, pp. 633-653.

Snyder, W.L., et al., "Dynamic Programming Approach to Unit Commitment", IEEE Transactions Power Systems, May 1987, vol. PWRS-2, Issue 2, pp. 339-348.

Ouyang, Z., et al., "Short-Term Unit Commitment Expert System", Electric Power Systems Research, Dec. 1990, vol. 20, Issue 1, pp. 1-13.

Ahmed, A., "A Multistage Stochastic Integer Programming Approach for Capacity Expansion Under Uncertainty", May 2003, vol. 26, Issue 1, pp. 1-21.

Salam, S., "Unit Commitment Solution Methods", Proceedings of World Academy of Science, Engineering and Technology, Dec. 2007, vol. 26, pp. 320-325.

Uyar, S., "Evolutionary Algorithms for the Unit Commitment Problem", Turkish Journal of Electrical Engineering & Computer Sciences, Nov. 2008, vol. 16, No. 3, pp. 239-255.

Akella, M., et al., "Branch and Price: Column Generation for Solving Huge Integer Programs", University at Buffalo, created Oct. 29, 2011, Department of Industrial Engineering, pp. 1-20.

Desrosiers, J., et al., "Branch-Price-and-Cut Algorithms", Wiley Encyclopedia of Operations Research and Management Science, Apr. 2010, pp. 1-18.

Ladanyi, L., et al., "Software Tools for Implementing Branch, Cut, and Price Algorithums", INFORMS Annual Meeting, Nov. 20, 2002, pp. 1-42.

Savelsbergh, M., "A Branch-and-Price Algorithm for the Generalized Assignment Problem", Operations Research, Nov.-Dec. 1997, vol. 45, No. 6, pp. 1-23.

Ljubic, I., "A Branch-Price-and-Cut Algorithm for Vertex-Biconnectivity Augmentation", Networks, Oct. 2010, vol. 56, Issue 3, pp. 1-29.

Villa et al., "A Column-Generation and Branch-and-Cut Approach to the Bandwidth-Packing Problem", J. of Research of NIST, vol. 111, No. 2, 2006, pp. 161-185.

Parvania et al., "Reliability-Constrained Unit Commitment using Stochastic Mixed-Integer Programming", IEEE 2010, pp. 200-205.

United States Office Action dated Sep. 10, 2014, received in related U.S. Appl. No. 13/414,044.

* cited by examiner

SYSTEMS AND METHODS FOR GENERATING WIND POWER SCENARIOS FOR WIND-POWER-INTEGRATED STOCHASTIC UNIT COMMITMENT PROBLEMS

CROSS-REFERENCE TO RELATED APPLICATIONS

The present disclosure relates to commonly-owned, co-pending U.S. patent application Ser. No. 13/414,044, filed Mar. 7, 2012, entitled SYSTEMS AND METHODS FOR SOLVING LARGE SCALE STOCHASTIC UNIT COMMITMENT PROBLEMS, the entire contents and disclosure of which is incorporated by reference as if fully set forth herein.

BACKGROUND

The present disclosure relates generally to systematic algorithms (and associated systems and methods) that take a forecast model as input and produce a discrete probability distribution as output, using scenario reduction ideas from stochastic programming. In one example, an algorithm (and associated system and method) creates scenarios sequentially for each time period, leading to a scenario tree. These algorithms (and associated systems and methods) contrast with conventional methods that typically create scenarios for all time periods simultaneously and/or which do not form a scenario tree.

DESCRIPTION OF RELATED ART

Optimization under uncertainty has received the attention of many researchers in the last few decades (Sahinidis 2004). Many real-life problems under uncertainty can be modeled as a stochastic programming problem in the form:

$$\min_{x \in X} \mathbb{E}_P f(\omega, x) \equiv \min_{x \in X} \int_\Omega f(\omega, x) P(d\omega),$$

where $X \subset \mathbb{R}^n$ is a given nonempty convex closed set, $\Omega$ a closed subset of $\mathbb{R}^s$ and $\mathcal{B}$ the Borel $\sigma$-field relative to $\Omega$, the function $f$ from $\Omega \subset \mathbb{R}^n$ to the extended reals $\mathbb{R}$ is measurable with respect to $\omega$ and lower semi-continuous and convex with respect to x, and P is a fixed probability measure on ($\Omega$, $\mathcal{B}$). This formulation models two-stage and multi-stage stochastic programming problems with recourse, where X is the feasible set of decisions and $f(\omega, x)$ evaluates the optimized decisions under the scenario that $\omega$ is realized.

SUMMARY

As described herein, one embodiment provides a method that takes wind speed forecasts as input, and uses Monte-Carlo sampling and scenario reduction techniques to generate scenarios that form a scenario tree. Conventional methods typically either don't use scenario reduction techniques (which may be crucial in decreasing the problem size) and/or don't produce a scenario tree as output. Having scenario trees is important in stochastic programming because using scenario trees leads to dynamic recourse decisions in the stochastic programming models.

In one embodiment, a system for providing scenario tree generation based at least in part upon scenario reduction is provided, the system comprising one or more processor units configured for: receiving for at least a first time period a first forecast, wherein the first forecast comprises a first set of scenarios; reducing the first set of scenarios to a first subset of scenarios, wherein the first subset of scenarios comprises a subset of the first set of scenarios; receiving for at least a second time period a second forecast, wherein the second forecast comprises a second set of scenarios; reducing the second set of scenarios to a second subset of scenarios, wherein the second subset of scenarios comprises a subset of the second set of scenarios; and generating a scenario tree based at least in part upon the first subset of scenarios and the second subset of scenarios; wherein the scenario tree has interperiod independency.

In another embodiment, a system for providing scenario tree generation based at least in part upon scenario reduction is provided, the system comprising one or more processor units configured for: receiving for each of a plurality of time periods a respective forecast, wherein the plurality of time periods comprise at least a first time period, at least a second time period and at least one intermediate time period, and wherein each forecast comprises a respective set of scenarios; for each time period in sequence, reducing the respective set of scenarios to a respective subset of scenarios, wherein each subset of scenarios comprises a subset of the respective set of scenarios; and generating a scenario tree based at least in part upon the subset of scenarios; wherein the scenario tree has interperiod independency.

In another embodiment, a method for providing scenario tree generation based at least in part upon scenario reduction is provided, the method comprising: receiving for at least a first time period a first forecast, wherein the first forecast comprises a first set of scenarios; reducing the first set of scenarios to a first subset of scenarios, wherein the first subset of scenarios comprises a subset of the first set of scenarios; receiving for at least a second time period a second forecast, wherein the second forecast comprises a second set of scenarios; reducing the second set of scenarios to a second subset of scenarios, wherein the second subset of scenarios comprises a subset of the second set of scenarios; and generating a scenario tree based at least in part upon the first subset of scenarios and the second subset of scenarios; wherein the scenario tree has interperiod independency.

In another embodiment, an article of manufacture is provided, comprising: at least one tangible computer usable medium having a computer readable program code logic tangibly embodied therein to execute at least one machine instruction in a processing unit for providing scenario tree generation based at least in part upon scenario reduction, said computer readable program code logic, when executing, performing the following steps: receiving for at least a first time period a first forecast, wherein the first forecast comprises a first set of scenarios; reducing the first set of scenarios to a first subset of scenarios, wherein the first subset of scenarios comprises a subset of the first set of scenarios; receiving for at least a second time period a second forecast, wherein the second forecast comprises a second set of scenarios; reducing the second set of scenarios to a second subset of scenarios, wherein the second subset of scenarios comprises a subset of the second set of scenarios; and generating a scenario tree based at least in part upon the first subset of scenarios and the second subset of scenarios; wherein the scenario tree has interperiod independency.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

Figure 1:
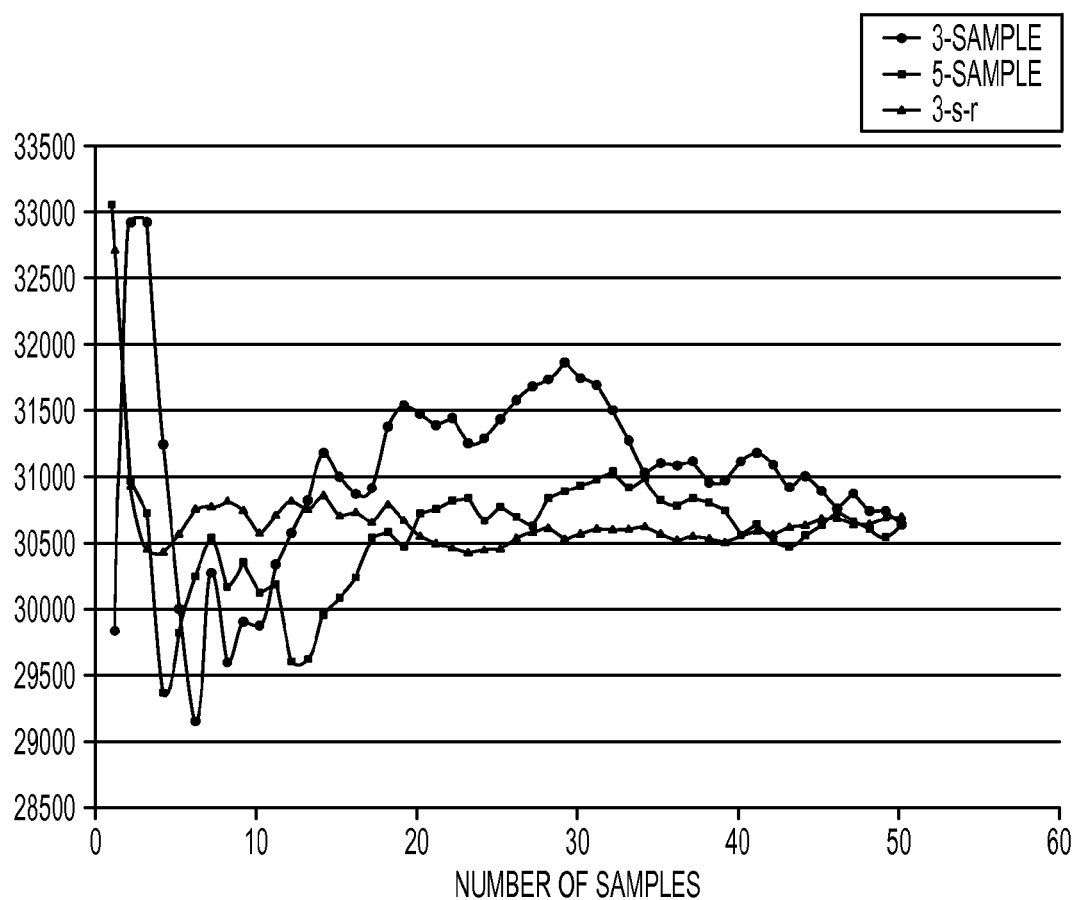
FIG. 1 depicts a graph comparing scenario tree generation methods according to embodiments of the present invention.

For the purposes of describing and claiming the present invention the term "scenario" is intended to refer to a postulated event, development or occurrence.

For the purposes of describing and claiming the present invention the term "scenario tree" is intended to refer to a tree-structured discrete probability distribution.

For the purposes of describing and claiming the present invention the term "forecast" is intended to refer to an estimation or calculation in advance.

For the purposes of describing and claiming the present invention the term "interperiod independency" is intended to refer to the following: if $\Xi$ has interperiod independency property we have:

$$Pr(\Xi = (\xi_{i^1}, \ldots , \xi_{i^T})) = \prod_{t=1}^{T} Pr(\Xi^t = \xi_{i^t}) = \prod_{t=1}^{T} p_{i^t}.$$

In one embodiment, a system for providing scenario tree generation based at least in part upon scenario reduction is provided, the system comprising one or more processor units configured for: receiving for at least a first time period a first forecast, wherein the first forecast comprises a first set of scenarios; reducing the first set of scenarios to a first subset of scenarios, wherein the first subset of scenarios comprises a subset of the first set of scenarios; receiving for at least a second time period a second forecast, wherein the second forecast comprises a second set of scenarios; reducing the second set of scenarios to a second subset of scenarios, wherein the second subset of scenarios comprises a subset of the second set of scenarios; and generating a scenario tree based at least in part upon the first subset of scenarios and the second subset of scenarios; wherein the scenario tree has interperiod independency.

In one example, the step of generating comprises using Algorithm 1 (shown below) with n$^t$ values in the input determined by the optimization problem in equation 8 (shown below). This Algorithm reduces a tree-structured discrete probability distribution (what we also call "scenario tree") to another tree-structured probability distribution with fewer scenarios.

In another example, the steps of reducing comprise applying an input $\Xi$ to an algorithm to produce an output $\tilde{\Xi}$.

In another example:

$$\Xi = \{\xi\}_{i=1}^{S}, \xi_i \in \mathbb{R}^T,$$

with marginal distributions $\Xi^t = \{\xi_{i^t}\}_{i^t \in I^t}$, t=1, ..., T, n$^t \in \mathbb{N}$, t=1, ..., T.

In another example:

$$\tilde{\Xi} = \{\tilde{\xi}\}_{j=1}^{\tilde{S}}, \tilde{\xi}_j \in \mathbb{R}^T,$$

with marginal distributions $\tilde{\Xi}^t = \{\tilde{\xi}_{j^t}\}_{j^t \in J^t}$, $|J^t|$=n$^t$, t=1, ..., T.

In another example, the algorithm comprises:

$$J^{*t} \leftarrow \underset{(\tilde{\xi}_1^t, \ldots, \tilde{\xi}_{n^t}^t) \in \mathbb{R}^{n^t}}{\operatorname{argmin}} \sum_{i=1}^{S} \min_{k=1 \ldots n^t} p_i |\xi_i^t - \tilde{\xi}_k^t|,$$

$t = 1, \ldots, T.$ (i.e., $J^{*t}$ is the set of $n^t$ − medians of $\Xi^t$.)

$$I^t(j^t) \leftarrow \left\{ i^t \in I^t \,\middle|\, j^t \in \underset{k^t \in J^{*t}}{\operatorname{argmin}} \sum_{t=1}^{T} |\xi_{i^t} - \tilde{\xi}_{k^t}| \right\},$$

$j^t \in J^{*t}, t = 1, \ldots T.$ $j \leftarrow 0,$ for all $(j^1, \ldots, j^T) \in J^{*1} \times \ldots \times J^{*T}$ do $j \leftarrow j + 1,$ $\tilde{\xi}_j = (\tilde{\xi}_{j^1}, \ldots, \tilde{\xi}_{j^T}),$ support $(\tilde{\Xi}) \leftarrow$ support $(\tilde{\Xi}) \cup \{\tilde{\xi}_j\},$ $$Pr(\tilde{\Xi} = \tilde{\xi}_j) =$$

$$q_j = \sum_{i^1 \in I^1(j^1)} \ldots \sum_{i^T \in I^T(j^T)} Pr(\Xi = (\xi_{i^1}, \ldots, \xi_{i^T})),$$

end for $\tilde{S} \leftarrow j,$ $$D_K(\Xi, \tilde{\Xi}) = \sum_{i=1}^{S} \min_{j=1, \ldots, \tilde{S}} \sum_{t=1}^{T} p_i |\xi_i^t - \tilde{\xi}_j^t|$$

$$= \sum_{i=1}^{S} \sum_{t=1}^{T} p_i |\xi_i^t - \tilde{\xi}_{j^t(i)}^t|$$

$$= \sum_{t=1}^{T} M^t(n^t).$$

In another example, the scenario tree is applied to a stochastic unit commitment problem.

In another example, the stochastic unit commitment problem relates to wind power generation.

In another example, each of the first forecast and the second forecast comprises a forecast of wind speed.

In another example, the steps are carried out in the order recited.

In another embodiment, a system for providing scenario tree generation based at least in part upon scenario reduction is provided, the system comprising one or more processor units configured for: receiving for each of a plurality of time periods a respective forecast, wherein the plurality of time periods comprise at least a first time period, at least a second time period and at least one intermediate time period, and wherein each forecast comprises a respective set of scenarios; for each time period in sequence, reducing the respective set of scenarios to a respective subset of scenarios, wherein each subset of scenarios comprises a subset of the respective set of scenarios; and generating a scenario tree based at least in part upon the subset of scenarios; wherein the scenario tree has interperiod independency.

In one example, the step of generating comprises using Algorithm 1 (shown below) with n$^t$ values in the input determined by the optimization problem in equation 8 (shown below). This Algorithm reduces a tree-structured discrete probability distribution (what we also call "scenario tree") to another tree-structured probability distribution with fewer scenarios.

In another example, the steps of reducing comprise applying an input $\Xi$ to an algorithm to produce an output $\tilde{\Xi}$.

In another example:

$\Xi = \{\xi_i\}_{i=1}^S, \xi_i \in \mathbb{R}^T$, with marginal distributions $\Xi^t = \{\xi_{i^t}\}_{i^t \in I^t}$, $t=1, \ldots, T$, $n^t \in \mathbb{N}$, $t=1, \ldots, T$.

In another example:

$\tilde{\Xi} = \{\tilde{\xi}_j\}_{j=1}^{\tilde{S}}, \tilde{\xi}_j \in \mathbb{R}^T$, with marginal distributions $\tilde{\Xi}^t = \{\tilde{\xi}_{j^t}\}_{j^t \in J^t}$, $|J^t| = n^t$, $t=1, \ldots, T$.

In another example, the algorithm comprises:

$$J^{*t} \leftarrow \underset{(\xi_1^t, \ldots, \xi_{n^t}^t) \in \mathbb{R}^{n^t}}{\operatorname{argmin}} \sum_{i=1}^s \min_{k=1\ldots n^t} p_i |\xi_i^t - \tilde{\xi}_k^t|,$$

$t = 1, \ldots, T.$ (i.e., $J^{*t}$ is the set of $n^t$ – medians of $\Xi^t$).

$$I^t(j^t) \leftarrow \left\{ i^t \in I^t \,\middle|\, j^t \in \underset{k^t \in J^{*t}}{\operatorname{argmin}} \sum_{t=1}^T |\xi_{i^t} - \tilde{\xi}_{k^t}| \right\}, j^t \in J^{*t},$$

$t = 1, \ldots T.$ $j \leftarrow 0,$ for all $(j^1, \ldots, j^T) \in J^{*1} \times \ldots \times J^{*T}$ do $j \leftarrow j + 1,$ $\tilde{\xi}_j = (\tilde{\xi}_{j^1}, \ldots, \tilde{\xi}_{j^T}),$ support$(\tilde{\Xi}) \leftarrow$ support$(\tilde{\Xi}) \cup \{\tilde{\xi}_j\},$ $Pr(\tilde{\Xi} = \tilde{\xi}_j) =$ $$q_j = \sum_{i^1 \in I^1(j^1)} \ldots \sum_{i^T \in I^T(j^T)} Pr(\Xi = (\xi_{i^1}, \ldots, \xi_{i^T})),$$

end for $\tilde{S} \leftarrow j,$ $$D_K(\Xi, \tilde{\Xi}) = \sum_{i=1}^S \min_{j=1,\ldots,\tilde{S}} \sum_{t=1}^T p_i |\xi_i^t - \tilde{\xi}_j^t|$$

$$= \sum_{i=1}^S \sum_{t=1}^T p_i |\xi_i^t - \tilde{\xi}_{j^t(i)}^t|$$

$$= \sum_{t=1}^T M^t(n^t).$$

In another example, the scenario tree is applied to a stochastic unit commitment problem.

In another example, the stochastic unit commitment problem relates to wind power generation.

In another example, each of the forecasts comprises a forecast of wind speed.

In another example, the steps are carried out in the order recited.

In another embodiment, a method for providing scenario tree generation based at least in part upon scenario reduction is provided, the method comprising: receiving for at least a first time period a first forecast, wherein the first forecast comprises a first set of scenarios; reducing the first set of scenarios to a first subset of scenarios, wherein the first subset of scenarios comprises a subset of the first set of scenarios; receiving for at least a second time period a second forecast, wherein the second forecast comprises a second set of scenarios; reducing the second set of scenarios to a second subset of scenarios, wherein the second subset of scenarios comprises a subset of the second set of scenarios; and generating a scenario tree based at least in part upon the first subset of scenarios and the second subset of scenarios; wherein the scenario tree has interperiod independency.

In one example, the step of generating comprises using Algorithm 1 (shown below) with $n^t$ values in the input determined by the optimization problem in equation 8 (shown below). This Algorithm reduces a tree-structured discrete probability distribution (what we also call "scenario tree") to another tree-structured probability distribution with fewer scenarios.

In another example, the steps of reducing comprise applying an input $\Xi$ to an algorithm to produce an output $\tilde{\Xi}$.

In another example:

$\Xi = \{\xi_i\}_{i=1}^S, \xi_i \in \mathbb{R}^T$, with marginal distributions $\Xi^t = \{\xi_{i^t}\}_{i^t \in I^t}$, $t=1, \ldots, T$, $n^t \in \mathbb{N}$, $t=1, \ldots, T$.

In another example:

$\tilde{\Xi} = \{\tilde{\xi}_j\}_{j=1}^{\tilde{S}}, \tilde{\xi}_j \in \mathbb{R}^T$, with marginal distributions $\tilde{\Xi}^t = \{\tilde{\xi}_{j^t}\}_{j^t \in J^t}$, $|J^t| = n^t$, $t=1, \ldots, T$, and wherein the algorithm comprises:

$$J^{*t} \leftarrow \underset{(\xi_1^t, \ldots, \xi_{n^t}^t) \in \mathbb{R}^{n^t}}{\operatorname{argmin}} \sum_{i=1}^s \min_{k=1\ldots n^t} p_i |\xi_i^t - \tilde{\xi}_k^t|,$$

$t = 1, \ldots, T.$ (i.e., $J^{*t}$ is the set of $n^t$ – medians of $\Xi^t$.)

$$I^t(j^t) \leftarrow \left\{ i^t \in I^t \,\middle|\, j^t \in \underset{k^t \in J^{*t}}{\operatorname{argmin}} \sum_{t=1}^T |\xi_{i^t} - \tilde{\xi}_{k^t}| \right\},$$

$j^t \in J^{*t}, t = 1, \ldots T.$ $j \leftarrow 0,$ for all $(j^1, \ldots, j^T) \in J^{*1} \times \ldots \times J^{*T}$ do $j \leftarrow j + 1,$ $\tilde{\xi}_j = (\tilde{\xi}_{j^1}, \ldots, \tilde{\xi}_{j^T}),$ support $(\tilde{\Xi}) \leftarrow$ support $(\tilde{\Xi}) \cup \{\tilde{\xi}_j\},$ $Pr(\tilde{\Xi} = \tilde{\xi}_j) =$ $$q_j = \sum_{i^1 \in I^1(j^1)} \ldots \sum_{i^T \in I^T(j^T)} Pr(\Xi = (\xi_{i^1}, \ldots, \xi_{i^T})),$$

end for $\tilde{S} \leftarrow j,$ $$D_K(\Xi, \tilde{\Xi}) = \sum_{i=1}^S \min_{j=1,\ldots,\tilde{S}} \sum_{t=1}^T p_i |\xi_i^t - \tilde{\xi}_j^t|$$

$$= \sum_{i=1}^S \sum_{t=1}^T p_i |\xi_i^t - \tilde{\xi}_{j^t(i)}^t|$$

$$= \sum_{t=1}^T M^t(n^t).$$

In another example, the steps are carried out in the order recited.

In another embodiment, an article of manufacture is provided, comprising: at least one tangible computer usable medium having a computer readable program code logic tangibly embodied therein to execute at least one machine instruction in a processing unit for providing scenario tree generation based at least in part upon scenario reduction, said computer readable program code logic, when executing, performing the following steps: receiving for at least a first time period a first forecast, wherein the first forecast comprises a first set of scenarios; reducing the first set of scenarios to a first subset of scenarios, wherein the first subset of scenarios comprises a subset of the first set of scenarios; receiving for at least a second time period a second forecast, wherein the second forecast comprises a second set of scenarios; reducing the second set of scenarios to a second subset of scenarios, wherein the second subset of scenarios comprises a subset of the second set of scenarios; and generating a scenario tree based at least in part upon the first subset of scenarios and the second subset of scenarios; wherein the scenario tree has interperiod independency.

In one example, the step of generating comprises using Algorithm 1 (shown below) with n' values in the input determined by the optimization problem in equation 8 (shown below). This Algorithm reduces a tree-structured discrete probability distribution (what we also call "scenario tree") to another tree-structured probability distribution with fewer scenarios.

In another example, the steps of reducing comprise applying an input $\Xi$ to an algorithm to produce an output $\tilde{\Xi}$.

In another example:

$$\Xi = \{\xi_i\}_{i=1}^{S}, \xi_i \in \mathbb{R}^T,$$

with marginal distributions $\Xi^t = \{\xi_i^t\}_{i^t \in I^t}$, t=1, ..., T, $n^t \in \mathbb{N}$, t=1, ..., T, $$\tilde{\Xi} = \{\tilde{\xi}_j\}_{j=1}^{\tilde{S}}, \tilde{\xi}_j \in \mathbb{R}^T,$$

with marginal distributions $\tilde{\Xi}^t = \{\tilde{\xi}_{j^t}\}_{j^t \in J^t}$, $|J^t| = n^t$, t=1, ..., T, and wherein the algorithm comprises:

$$J^{*t} \leftarrow \underset{(\xi_1^t, \ldots, \xi_{n^t}^t) \in \mathbb{R}^{n^t}}{\operatorname{argmin}} \sum_{i=1}^{S} \min_{k=1 \ldots n^t} p_i |\xi_i^t - \tilde{\xi}_k^t|,$$

$t = 1, \ldots, T.$ (i.e., $J^{*t}$ is the set of $n^t$ – medians of $\Xi^t$).

$$I^t(j^t) \leftarrow \left\{ i^t \in I^t \,\middle|\, j^t \in \underset{k^t \in J^{*t}}{\operatorname{argmin}} \sum_{t=1}^{T} |\xi_{i^t} - \tilde{\xi}_{k^t}| \right\}, j^t \in J^{*t},$$

$t = 1, \ldots T.$ $j \leftarrow 0,$ for all $(j^1, \ldots, j^T) \in J^{*1} \times \ldots \times J^{*T}$ do $j \leftarrow j + 1,$ $\tilde{\xi}_j = (\tilde{\xi}_{j^1}, \ldots, \tilde{\xi}_{j^T}),$ support($\tilde{\Xi}$) ← support($\tilde{\Xi}$) ∪ $\{\tilde{\xi}_j\}$, $Pr(\tilde{\Xi} = \tilde{\xi}_j) =$ $$q_j = \sum_{i^1 \in I^1(j^1)} \ldots \sum_{i^T \in I^T(j^T)} Pr(\Xi = (\xi_{i^1}, \ldots, \xi_{i^T})),$$

end for $\tilde{S} \leftarrow j,$ $$D_K(\Xi, \tilde{\Xi}) = \sum_{i=1}^{S} \min_{j=1, \ldots, \tilde{S}} \sum_{t=1}^{T} p_i |\xi_i^t - \tilde{\xi}_j^t|$$

$$= \sum_{i=1}^{S} \sum_{t=1}^{T} p_i |\xi_i^t - \tilde{\xi}_{j^t(i)}^t|$$

$$= \sum_{t=1}^{T} M^t(n^t).$$

In another example, the steps are carried out in the order recited.

In one embodiment, a method comprises the following: (a) first, forecasts from a forecast model are produced; (b) next, a scenario reduction technique is used to get a smaller yet representative set of scenarios. In one example, this two-step procedure is repeated for all time periods sequentially starting from the first time period going until the last time period. At a time period, the number of scenarios in the reduced set determines the number of children of that node in the scenario tree, and is given as further input to the method.

In another embodiment, if the forecast model has a closed form with necessary conditions, the two-step procedure is replaced by a single operation that analytically finds a set of scenarios closest to the forecast model.

As mentioned above, optimization under uncertainty has received the attention of many researchers in the last few decades (Sahinidis 2004). Many real-life problems under uncertainty can be modeled as a stochastic programming problem in the form:

$$\min_{x \in X} \mathbb{E}_P f(\omega, x) \equiv \min_{x \in X} \int_\Omega f(\omega, x) P(d\omega), \qquad (1)$$

where $X \subset \mathbb{R}^n$ is a given nonempty convex closed set, $\Omega$ a closed subset of $\mathbb{R}^s$ and $\mathcal{B}$ the Borel $\sigma$-field relative to $\Omega$, the function $f$ from $\Omega \subset \mathbb{R}^n$ to the extended reals $\overline{\mathbb{R}}$ is measurable with respect to $\omega$ and lower semi-continuous and convex with respect to x, and P is a fixed probability measure on ($\Omega$, $\mathcal{B}$). This formulation models two-stage and multi-stage stochastic programming problems with recourse, where X is the feasible set of decisions and $f(\omega, x)$ evaluates the optimized decisions under the scenario that $\omega$ is realized.

Many issues concerning the formulation of model (1) and solution methodologies designed to solve it have to be addressed. Model (1) is usually a large-scale problem with multi-stage decisions, P is not known precisely, and $f$ is given implicitly as an iterated optimal value. One approach to decrease the size of model (1) and make it computationally tractable is to approximate the probability measure P by a discrete probability measure with a manageable number of probability atoms. Dupačová et al. (2003) and Heitsch and Römisch (2003) consider a version of model (1) with a discrete probability measure P. The authors describe a methodology to reduce P to another discrete probability distribution with a finite support such that the Kantorovich distance between the two distributions is minimized. The authors show that model (1) remains stable to perturbations to its underlying probability distribution as long as the Kantorovich distance between the original distribution and the perturbed distribution is kept under control. Here the stability of a stochastic program means that its optimal value and the set of its ϵ-optimal solutions change continuously with perturbations to its underlying probability distribution.

Noting that a scenario tree is a discrete probability distribution, Gröve-Kuska and Römisch (2005, Chapter 30) proposes a heuristic algorithm that generates a scenario tree from a set of sample paths (i.e., possible realizations of a discrete probability distribution) using these scenario reduction techniques such that the Kantorovich distance between the set of sample paths and the set of scenarios in the scenario tree is minimized. The authors consider a general discrete probability distribution (scenario tree) and propose only a heuristic algorithm to reduce it. In this disclosure we assume more structure on the underlying probability distribution and provide (as one embodiment) an exact algorithm that reduces a discrete distribution to its closest distribution. We also prove a property of the reduced distribution that helps in reducing the computational effort of scenario reduction and in generating scenario trees from continuous distributions. We apply various embodiments to instances of the stochastic unit commitment problem.

We first develop a lower bound on the minimum Kantorovich distance that can be achieved by reducing a discrete probability distribution to an arbitrary discrete probability distribution with a cardinality restriction on the number of distinct realizations at each time period. We then focus on discrete probability distributions that have interperiod independency property, and develop an exact reduction algorithm that finds the reduced distribution closest to it. We show that the reduction can be performed at each time period of the original distribution independent of the other time periods. This decoupling property enables us to reduce the combinatorial-sized scenario tree with a much smaller computational effort. This also enables us to reduce continuous probability measures with interperiod independency property to much smaller discrete probability measures by successively applying Monte Carlo sampling and scenario reduction at each time period.

Reference will now be made to Scenario Tree Generation by Scenario Reduction. Let $\Xi = \{\xi_i\}_{i=1}^{S}$ be a T-dimensional discrete probability distribution with finite support, where $\xi_i \in \mathbb{R}^T$, $\Pr(\Xi = \xi_i) = p_i$, $p_i \geq 0$, $i=1, \ldots, S$, $\Sigma_{i=1}^{S} p_i = 1$. Let $\tilde{\Xi} = \{\tilde{\xi}_j\}_{j=1}^{\tilde{S}}$ be the reduced distribution with $\Pr(\tilde{\Xi} = \tilde{\xi}_j) = q_j$, $q_j \geq 0$, $j=1, \ldots, \tilde{S}$, $\Sigma_{j=1}^{\tilde{S}} q_j = 1$. Let $\Xi^t(\tilde{\Xi}^t)$ denote the marginal distribution of $\Xi$ ($\tilde{\Xi}$) at $t^{th}$ time period, i.e., $$Pr(\Xi^t = \xi_{i'}^t) = \sum_{i=1}^{S} Pr(\Xi = \xi_i, \xi_i^t = \xi_{i'}^t) = \rho_{i'},$$

$i' \in I^t, t = 1, \ldots, T,$ $$Pr(\tilde{\Xi}^t = \tilde{\xi}_{j'}^t) = \sum_{j=1}^{\tilde{S}} Pr(\tilde{\Xi} = \tilde{\xi}_j, \tilde{\xi}_j^t = \tilde{\xi}_{j'}^t) = \pi_{j'},$$

$j' \in J^t, t = 1, \ldots, T,$ where $I^t$ ($J^t$) is the support of $\Xi^t$ ($\tilde{\Xi}^t$) with cardinality $m^t$ ($n^t$). We aim to find a lower bound on the minimum Kantorovich distance between $\Xi^t$ and an arbitrary distribution $\tilde{\Xi}^t$ with the number of distinct realization at each time period at most $n^t$, $t=1, \ldots, T$.

Reference will now be made to the Lower Bound on the Minimum Kantorovich Distance. The Kantorovich distance between $\Xi$ and $\tilde{\Xi}$ reduces to the optimal value of a linear transportation problem:

$$D_K(\Xi, \tilde{\Xi}) = \quad (2)$$

$$\inf\left\{\sum_{i=1}^{S}\sum_{j=1}^{\tilde{S}} \eta_{ij} c(\xi_i, \tilde{\xi}_j) : \eta_{ij} \geq 0, \sum_{i=1}^{S} \eta_{ij} = q_j, \sum_{j=1}^{\tilde{S}} \eta_{ij} = p_i, \forall i, \forall j\right\},$$

where $c(\xi_i, \tilde{\xi}_j) = \Sigma_{t=1}^{T} |\xi_i^t - \tilde{\xi}_j^t|$. To obtain a distribution $\tilde{\Xi}$ that is closest to $\Xi$ in terms of the Kantorovich distance, we use arbitrary probability weights, $q_j$, for $\tilde{\Xi}$. The infimization in (2) becomes $$D_K(\Xi, \tilde{\Xi}) = \sum_{i=1}^{S} p_i \min_{j=1,\ldots,\tilde{S}} \sum_{t=1}^{T} |\xi_i^t - \tilde{\xi}_j^t| \quad (3)$$

with new probability weights, $$I(j) = \left\{ i = 1, \ldots, S \,\middle|\, j \in \underset{j=1,\ldots,\tilde{S}}{\operatorname{argmin}} \sum_{t=1}^{T} |\xi_i^t - \tilde{\xi}_j^t| \right\}$$

where $$q_j^* = \sum_{i \in I(j)} p_i,$$

The set argminn is a singleton subset of the set argminn obtained by, without loss of generality, deleting all elements of the set argmin but the smallest one in lexicographic order. To get a lower bound on the Kantorovich distance we change the order of summation and minimization in (3):

$$D_K(\Xi, \tilde{\Xi}) = \sum_{i=1}^{S} p_i \min_{j=1,\ldots,\tilde{S}} \sum_{t=1}^{T} |\xi_i^t - \tilde{\xi}_j^t| \geq \quad (4)$$

$$\sum_{i=1}^{S} p_i \sum_{t=1}^{T} \min_{j=1,\ldots,\tilde{S}} |\xi_i^t - \tilde{\xi}_j^t|$$

$$= \sum_{t=1}^{T} \sum_{i=1}^{S} \min_{j=1,\ldots,\tilde{S}} p_i |\xi_i^t - \tilde{\xi}_j^t|.$$

To obtain a lower bound on the minimum Kantorovich distance, we use arbitrary realizations $\tilde{\xi}_j$ for the reduced distribution $\tilde{\Xi}$, with the restriction that the cardinality of the support of $\tilde{\Xi}^t$ is $n^t$, $t=1, \ldots, T$:

$$\min_{\tilde{\Xi}=\{\tilde{\xi}\}_{j=1}^{\tilde{S}}} D_K(\Xi, \tilde{\Xi}) \geq \min_{\tilde{\Xi}=\{\tilde{\xi}\}_{j=1}^{\tilde{S}}} \sum_{t=1}^{T} \sum_{i=1}^{S} \min_{j=1,\ldots,\tilde{S}} p_i |\xi_i^t - \tilde{\xi}_j^t| = \quad (5)$$

$$\min_{\substack{\tilde{\xi}_1^1,\ldots,\tilde{\xi}_1^T \\ \ldots \\ \tilde{\xi}_{\tilde{S}}^1,\ldots,\tilde{\xi}_{\tilde{S}}^T}} \sum_{t=1}^{T} \sum_{i=1}^{S} \min_{j=1,\ldots,\tilde{S}} p_i |\xi_i^t - \tilde{\xi}_j^t| =$$

-continued $$\sum_{t=1}^{T} \min_{\tilde{\xi}_1^t,\ldots,\tilde{\xi}_{n^t}^t} \sum_{i=1}^{S} \min_{j=1,\ldots,n^t} p_i |\xi_i^t - \tilde{\xi}_j^t| = \sum_{t=1}^{T} M^t(n^t),$$

where $M^t(1)$ is the median of the probability distribution $\Xi^t$, and, in general, $M^t(k)$ is the k-median of $\Xi^t$. We note that if we allow $\tilde{\Xi}$ to have as many realizations as $\Xi$, then the reduced distribution closest to $\Xi$ trivially becomes $\Xi$ itself. In this case, $n^t$ becomes equal to $m^t$ for $t=1, \ldots, T$, and thus $M^t(n^t)$ becomes equal to zero. Thus, $n^t$ is a control parameter on the flexibility of choosing the reduced distribution with as many realizations as possible.

Reference will now be made to Discrete Distributions with Interperiod Independency Property. In this section we focus on discrete distributions with interperiod independency property, and give an algorithm that reduces these distributions to another such distribution. If $\Xi$ has interperiod independency property we have $$Pr(\Xi = (\xi_{i^1}, \ldots, \xi_{i^T})) = \prod_{t=1}^{T} Pr(\Xi^t = \xi_{i^t}) = \prod_{t=1}^{T} \rho_{i^t}.$$

We use Algorithm 1 (below) to reduce $\Xi$ to $\tilde{\Xi}$. We show that the distance between $\Xi$ and $\tilde{\Xi}$ is equal to the lower bound provided by (5). Given $i=1, \ldots, S$, and $t=1, \ldots, T$, we let $j^t(i) \in J^{*t}$ denote the smallest index such that $|\xi_i^t - \tilde{\xi}_{j^t(i)}^t| \leq |\xi_i^t - \tilde{\xi}_{j'}^t|$, $\forall j'^t \in J^{*t}$. We let $j(i) \in \{i, \ldots, \tilde{S}\}$ such that $\tilde{\xi}_{j(i)} = (\tilde{\xi}_{j^1(i)}, \ldots, \tilde{\xi}_{j^T(i)})$. We note that by construction of $\tilde{\Xi}$, such $j(i)$ exists. Then, $$\min_{j=1,\ldots,\tilde{S}} \sum_{t=1}^{T} p_i |\xi_i^t - \tilde{\xi}_j^t| = \sum_{t=1}^{T} p_i |\xi_i^t - \tilde{\xi}_{j(i)}^t| = \sum_{t=1}^{T} p_i |\xi_i^t - \tilde{\xi}_{j^t(i)}^t|.$$

Thus,
Algorithm 1, Construct $\tilde{\Xi}$ from $\Xi$

Input: $\Xi = \{\xi_i\}_{i=1}^{S}, \xi_i \in \mathbb{R}^T$, with marginal distributions $\Xi^t = \{\xi_{i^t}\}_{i^t \in I^t}, t = 1, \ldots, T$, $n^t \in \mathbb{N}, t = 1 \ldots, T$.

Output: $\tilde{\Xi} = \{\tilde{\xi}_j\}_{j=1}^{\tilde{S}}, \tilde{\xi}_j \in \mathbb{R}^T$, with marginal distributions $\tilde{\Xi}^t = \{\tilde{\xi}_{j^t}\}_{j^t \in J^t}$, $|J^t| = n^t, t = 1, \ldots, T$.

...

$J^{*t} \leftarrow \underset{(\tilde{\xi}_1^t,\ldots,\tilde{\xi}_{n^t}^t) \in \mathbb{R}^{n^t}}{\operatorname{argmin}} \sum_{i=1}^{S} \min_{k=1\ldots n^t} p_i |\xi_i^t - \tilde{\xi}_k^t|,$ $t = 1, \ldots, T$. (i.e., $J^{*t}$ is the set of $n^t$ – medians of $\Xi^t$.)

$I^t(j^t) \leftarrow \left\{ i^t \in I^t \mid j^t \in \underset{k^t \in J^{*t}}{\operatorname{argmin}} \sum_{t=1}^{T} |\xi_{i^t} - \tilde{\xi}_{k^t}| \right\},$ $j^t \in J^{*t}, t = 1, \ldots T$.

$j \leftarrow 0$, for all $(j^1, \ldots, j^T) \in J^{*1} \times \cdots \times J^{*T}$ do -continued $j \leftarrow j + 1$, $\tilde{\xi}_j = (\tilde{\xi}_{j^1}, \ldots, \tilde{\xi}_{j^T})$, $\operatorname{support}(\tilde{\Xi}) \leftarrow \operatorname{support}(\tilde{\Xi}) \cup \{\tilde{\xi}_j\},$ $Pr(\tilde{\Xi} = \tilde{\xi}_j) = $ $\qquad q_j = \sum_{i^1 \in I^1(j^1)} \cdots \sum_{i^T \in I^T(j^T)} Pr(\Xi = (\xi_{i^1}, \ldots, \xi_{i^T})),$ end for $\tilde{S} \leftarrow j,$ $$D_K(\Xi, \tilde{\Xi}) = \sum_{i=1}^{S} \min_{j=1,\ldots,\tilde{S}} \sum_{t=1}^{T} p_i |\xi_i^t - \tilde{\xi}_j^t|$$

$$= \sum_{i=1}^{S} \sum_{t=1}^{T} p_i |\xi_i^t - \tilde{\xi}_{j^t(i)}^t|$$

$$= \sum_{t=1}^{T} M^t(n^t).$$

If, in addition, $\Xi$ has interperiod independency property, we have $$Pr(\Xi = (\xi_{i^1}, \ldots, \xi_{i^T})) = \prod_{t=1}^{T} Pr(\Xi^t = \xi_{i^t})$$

$$= \prod_{t=1}^{T} \rho_{i^t}.$$

Thus, for $\tilde{\xi}_j = (\tilde{\xi}_{j^1}, \ldots, \tilde{\xi}_{j^T})$, $$Pr(\tilde{\Xi} = \tilde{\xi}_j) = \sum_{i^1 \in I^1(j^1)} \cdots \sum_{i^T \in I^T(j^T)} Pr(\Xi = (\xi_{i^1}, \ldots, \xi_{i^T})) \quad (6)$$

$$= \sum_{i^1 \in I^1(j^1)} \cdots \sum_{i^T \in I^T(j^T)} \prod_{t=1}^{T} \rho_{i^t}$$

$$= \prod_{t=1}^{T} \left( \sum_{i^t \in I^t(j^t)} \rho_{i^t} \right)$$

$$= \prod_{t=1}^{T} Pr(\tilde{\Xi}^t = \tilde{\xi}_{j^t})$$

$$\prod_{t=1}^{T} \pi_{j^t}.$$

Hence, the reduced distribution has interperiod independency property as well.

Reference will now be made to a Scenario Tree with Minimum Distance. Given a discrete probability distribution with interperiod independency property, Algorithm 1 allows us to generate a scenario tree closest to it such that the reduced tree has interperiod independency property and has $n^t$ number of realizations at each time period. But, typically the size of the scenario tree is given by total number of scenarios $n(=\Pi_{t=1}^{T} n^t)$, not by the number of realizations at each time period. We give an optimization problem that finds a scenario tree closest to the original distribution with interperiod independency property and with at most n scenarios. Let the binary decision variable $z_\eta^t$ take value 1 if the scenario tree has $\eta$ scenarios at time period t, and 0 otherwise. Consider the following minimization problem:

$$\min_z \sum_{t=1}^{T}\sum_{\eta=1}^{n} M^t(\eta)z_\eta^t \quad (7)$$

$$s.t. \prod_{t=1}^{T}\left(\sum_{\eta=1}^{n}\eta z_\eta^t\right) \le n,$$

$$\sum_{\eta=1}^{n} z_\eta^t = 1, t = 1, \ldots, T,$$

$$z_\eta^t \in \{0,1\}, t = 1, \ldots T, \eta = 1, \ldots, n.$$

This optimization problem gives the parameters ($n^t$) of the closest scenario tree with interperiod independency property and with at most n scenarios We can linearize this by noting that log function is increasing and by noting the binary nature of the z variables and the constraint $\Sigma_{\eta=1}^{n} z_\eta^t = 1$, t=1, ..., T. That is, $$\prod_{t=1}^{T}\left(\sum_{\eta=1}^{n}\eta z_\eta^t\right) \le n \Leftrightarrow$$

$$\sum_{t=1}^{T}\log\left(\sum_{\eta=1}^{n}\eta z_\eta^t\right) \le \log(n) \Leftrightarrow \sum_{t=1}^{T}\sum_{\eta=1}^{n}\log(\eta)z_\eta^t \le \log(n).$$

And thus the linearized problem reads:

$$\min_z \sum_{t=1}^{T}\sum_{\eta=1}^{n} M^t(\eta)z_\eta^t \quad (8)$$

$$s.t. \sum_{t=1}^{T}\sum_{\eta=1}^{n}\log(\eta)z_\eta^t \le \log(n),$$

$$\sum_{\eta=1}^{n} z_\eta^t = 1, t = 1, \ldots, T,$$

$$z_\eta^t \in \{0,1\}, t = 1, \ldots, T, \eta = 1, \ldots, n.$$

Reference will now be made to an Application to a Stochastic Unit Commitment Problem. This example unit commitment problem relates to finding an optimal up and down schedule and corresponding generation amounts for a set of generators over a twenty-four-hour horizon so that total cost of generation and transmission is minimized, and a set of constraints, such as demand requirements, upper and lower limits of generation, minimum up/down time limits, ramp up/down constraints, transmission constraints is observed. Unit commitment (UC) lies at the core of planning and operational decisions faced by independent system operators (ISOs), regional transmission organizations (RTOs), and utility companies. Hence it has received a good deal of attention in the industry.

The academic literature on the unit commitment problem dates back to the 1960s. An integer programming approach proposed by Dillon et al. (1978) was one of the earliest optimization-based approaches to the unit commitment problem. The authors address the unit commitment problem of hydro-thermal systems with reserve requirements. It was one of the earliest papers that can solve real life problems with 20 units. The authors developed two sets of valid inequalities that were globally valid to the problem and used these inequalities in the branch-and-bound algorithm. The dynamic programming approach developed by Snyder et al. [W. L. Snyder Jr., H. D. Powell, Jr, and J. C. Rayburn, "Dynamic programming approach to unit commitment", IEEE Transactions Power Systems, 2 (1987), p. 339-347] was one of the earliest successful dynamic programming algorithms. The algorithm featured a classification of units so as to reduce the number of states. The authors addressed the problem at San Diego Gas & Electric System with 30 generators. Expert systems [Z. Ouyang, and S. M. Shahidehpour, "Short-term unit commitment expert system", Electric Power Systems Research, 20 (1990), pp. 1-13], fuzzy logic [S. Saneifard, N. R. Prasad, and H. A. Smolleck, "A fuzzy logic approach to unit commitment", IEEE Transactions on Power Systems, 12 (1997), pp. 988-995], meta-heuristic algorithms [A. H. Mantawy, Y. L. Abdel-Magid, and S. Z. Selim, "Integrating genetic algorithms, tabu search and simulated annealing for the unit commitment problem," IEEE Transactions Power Systems, 14 (1999), pp. 829-836], and ant colony systems [S. J. Huang, "Enhancement of hydroelectric generation scheduling using ant colony system based optimization approaches", IEEE Transactions on Energy Conservation, 16 (2001), pp. 296-301] are among the other approaches that have been applied to the unit commitment problem. Surveys by Sheble and Fand [G. B. Sheble, G. N. Fand, "Unit commitment—Literature synopsis", IEEE Transactions on Power Systems, 9 (1994), pp. 128-135] and by Padhy [N. P. Padhy, "Unit commitment—A bibliographical survey", IEEE Transactions on Power Systems, 19 (2004), pp. 1196-2005] review the academic literature on the unit commitment problem, and the book by Wood and Wollenberg [A. J. Wood and B. F. Wollenburg, "Power Generation Operation and Control", John Wiley and Sons, New York, 1996] addresses several operational and planning problems in the energy industry, including the unit commitment problem. We first give a deterministic version of the unit commitment problem and then introduce the stochastic unit commitment problem:

Indices and Sets:

| | |
|---|---|
| $i \in I$ | generators |
| $t \in \{1, \ldots, T\}$ | time periods |

Data:

| | |
|---|---|
| $S_i(.)$ | startup cost function of unit i |
| $H_i(.)$ | shutdown cost function of unit i |
| $f_i(.)$ | generation cose function of unit i |
| $(Q_i, q_i)$ | maximum and minimum amounts for units i's offer |
| $(R_i, r_i)$ | ramp-up and ramp-down amounts for unit i |
| $(L_i, l_i)$ | minimum up and down times for unit i |
| $d_t$ | load at time period t |

Decision Variables:

| | |
|---|---|
| $g_{it}$ | generation provided by unit i at time period t |
| $s_{it}$ | binary variable indicating if unit i started at time period t |
| $u_{it}$ | binary variable indicating if unit i is on at time period t |
| $\bar{u}_{it}$ | vector of $u_{it}$ variables. $\bar{u}_{it} = (u_{i\tau}), \tau = t - l_i + 1, \ldots, t$. For $\tau < 0$, $u_{i\tau}$ is set to the on/off state of unit i at time period $\tau$. |

-continued $\underline{u}_{it}$     vector of $u_{it}$ variables.
$\underline{u}_{it} \equiv (u_{i\tau}), \tau = t - L_i + 1, \ldots, t$. For $\tau < 0$, $u_{i\tau}$ is set to the on/off state of unit i at time period $\tau$.

Formulation:

$$\min_{g,u,s} \sum_{t=1}^{T} \sum_{i \in I} S_i(\overline{u}_{it}) + H_i(\underline{u}_{it}) + f_i(g_{it}) \quad (9a)$$

$$s.t. \sum_{i \in I} g_{it} \geq d_t, t = 1, \ldots, T, \quad (9b)$$

$$q_i u_{it} \leq g_{it} \leq Q_i u_{it}, i \in I, t = 1, \ldots, T \quad (9c)$$

$$s_{it} \geq u_{it} - u_{i,t-1}, i \in I, t = 1, \ldots, T \quad (9d)$$

$$g_{it} - g_{i,t-1} \leq R_i, i \in I, t = 1, \ldots, T \quad (9e)$$

$$g_{i,t-1} - g_{it} \leq r_i, i \in I, t = 1, \ldots, T \quad (9f)$$

$$\sum_{\tau = \max\{1, t-L_i+1\}}^{t} s_{i\tau} \leq u_{it}, i \in I, t = 1, \ldots, T \quad (9g)$$

$$\sum_{\tau=t+1}^{\min\{T,t+l_i\}} s_{i\tau} \leq 1 - u_{it}, i \in I, t = 1, \ldots, T \quad (9h)$$

$$u_{it} \in \{0,1\}, s_{it} \in \{0,1\}, g_{it} \geq 0, i \in I, t = 1, \ldots, T \quad (9i)$$

Objective function (9a) is the total cost of generation summed over all time periods. Cost of generation includes startup cost, shutdown cost, and fuel cost. Startup (shutdown) cost can be a step function that takes its highest step value when the unit has been down (up) for a certain number of time periods, or it can be a piecewise function that increases with the number of time periods the unit has been down (up). Fuel cost may be a nonlinear function of generation level, which may not be convex. Constraint (9b) requires total generation be greater than the load. Constraint (9c) has two functions: If the unit is down, it forces the generation to be zero; and, if the unit is up, it arranges the generation level to be between the upper and lower limits of the generator. Constraint (9d) links the start-up variables to up/down variables. Constraints (9e) and (9f) handle ramp-up and ramp-down limits. Constraint (9g) is for minimum up time and constraint (9h) is for minimum down time requirement. Finally constraint (9i) puts binary and nonnegativity requirements.

Minimum up/down time constraints are sometimes formulated as $$u_{it} - u_{i,t-1} \leq u_{i\tau}, \tau \in \{t+1, \ldots, \min\{t+L_i, T\}\}, i \in I, t \in T \quad (10a)$$

$$u_{i,t-1} - u_{it} \leq 1 - u_{i\tau}, \tau \in \{t+1, \ldots, \min\{t+l_i, T\}\}, i \in I, t \in T \quad (10b)$$

If the set of constraints (10) is used to model the minimum up/down time constraints, there is no need to introduce variable $s_{it}$ in model (9). Rajan and Takriti claims that constraints (9d), (9g), and (9h) model the minimum up/down time polytope.

We use a stochastic programming approach to address the uncertainty and intermittency of the wind power. We assume that the uncertainty evolves as a discrete time stochastic process with a finite probability space. We represent the information structure as a rooted scenario tree where the nodes n (n∈N) in level t (t∈T) of the scenario tree constitute the states of the world that can be distinguished by the information available up to time period t (Ahmed et al. 2003, Singh et al. 2009). The set of leaf nodes, $N_L$ ($N_L \subset N$), contains the nodes without any successor. The root node is the node without any predecessor. In general, $n(\tau) \in N$ represents the $\tau^{th}$ predecessor of node n. The level of the root node is zero, and in general the level of a node, $t_n$, is defined such that $n(t_n)$ is the root node. The tree has a depth of T, and all leaf nodes have a level of T. By convention, n(0) is the node n itself, and $n(\tau)$, $\tau > t_n$, is an empty set.

The root node has an occurrence probability of one. For each node n∈N, $\pi_n$ denotes the probability that the corresponding state of the world occurs given that its predecessor, n(1), has occurred; and $p_n$ denotes the unconditional probability that the corresponding state occurs, i.e., $p_n = \Pi_{\tau=0}^{t_n-1} \pi_{n(\tau)}$. There is a one-to-one matching between the leaf nodes of the scenario tree and the scenarios. Given a leaf node, n∈$N_L$, a T-tuple [n(T), n(T-1), ..., n(1), n] represents a scenario with probability of occurrence equal to $p_n$. Two scenarios sharing the same state of the world at time periods 1, ..., $\tau$, for some $\tau < T$, have to observe the same set of decision variables in the optimization model, in order to make sure that the model does not cheat by foreseeing (anticipating) the future. Using only a single set of decision variables for each node guarantees such a non-anticipativity property, and yet keeps the model size small as compared to using a separate set of decision variables for each scenario and for each time period and setting the variables equal to each other (Tahiti et al. 2000, Lulli and Sen 2004).

The stochastic unit commitment model is an extension of model (9), where nodes n in the scenario tree replace the time periods t in the deterministic model (9).

Formulation:

$$\min_{g,u,s} \sum_{n \in N} p_n \sum_{i \in I} S_i(\overline{u}_{in}) + H_i(\underline{u}_{in}) + f_i(g_{in}) \quad (11a)$$

$$s.t. \sum_{i \in I} g_{in} \geq d_n, n \in N, \quad (11b)$$

$$q_i u_{in} \leq g_{in} \leq Q_i u_{in}, i \in I, n \in N \quad (11c)$$

$$s_{in} \geq u_{in} - u_{i,n(1)}, i \in I, n \in N \quad (11d)$$

$$g_{in} - g_{i,n(1)} \leq R_i, i \in I, n \in N \quad (11e)$$

$$g_{i,n(1)} - g_{in} \leq r_i, i \in I, n \in N \quad (11f)$$

$$\sum_{\tau=0}^{L_i-1} s_{i,n(\tau)} \leq u_{in}, i \in I, n \in N \quad (11g)$$

$$\sum_{\tau=1}^{l_i-1} s_{i,n(\tau)} \leq 1 - u_{i,n(l_i)}, i \in I, n:n(l_i) \in N \quad (11h)$$

$$\sum_{\tau=1}^{l_i-1-p} s_{i,n(\tau)} \leq 1 - u_{i,n(l_i-p)}, i \in I, n \in N_L, p \in \{1, \ldots, l_i-1\} \quad (11i)$$

$$u_{in} \in \{0,1\}, s_{in} \in \{0,1\}, g_{in} \geq 0 \quad (11j)$$

We consider a simple wind model example with four time periods. Wind speed at each time period follows a Gaussian random variable with a mean of 10 miles per hour and a standard deviation of 2.5 miles per hour. We compare three approaches to generate a scenario tree. First approach samples five points from the Gaussian random variable for each time period and constructs a scenario tree with 625 scenarios (see "5-sample" in FIG. 1, graphed as square points). We solve the stochastic unit commitment problem using this tree. We repeat this process fifty times and take cumulative average of the optimal value of the problem. The second approach does similarly by sampling 3 scenarios per time period with a total of 81 scenarios (see "3-sample" in FIG. 1, graphed as diamond points). And the third approach uses the above scenario reduction technique. It first generates 100 samples from the Gaussian random variable, and then reduces it to 3 points. It generates a scenario tree for four time periods using these 3 points with a total of 81 scenarios (see "3-s-r" in FIG. 1, graphed as x points). FIG. 1 shows better convergence of the last approach, as it is actually reducing a scenario tree with $100^3=1000000$ scenarios to $3^3=81$ scenarios, whereas the first approach uses only 625 scenarios and the second approach uses 81 scenarios. We also observe the better convergence of the first approach over the second, as it uses more scenarios.

Figure 2:
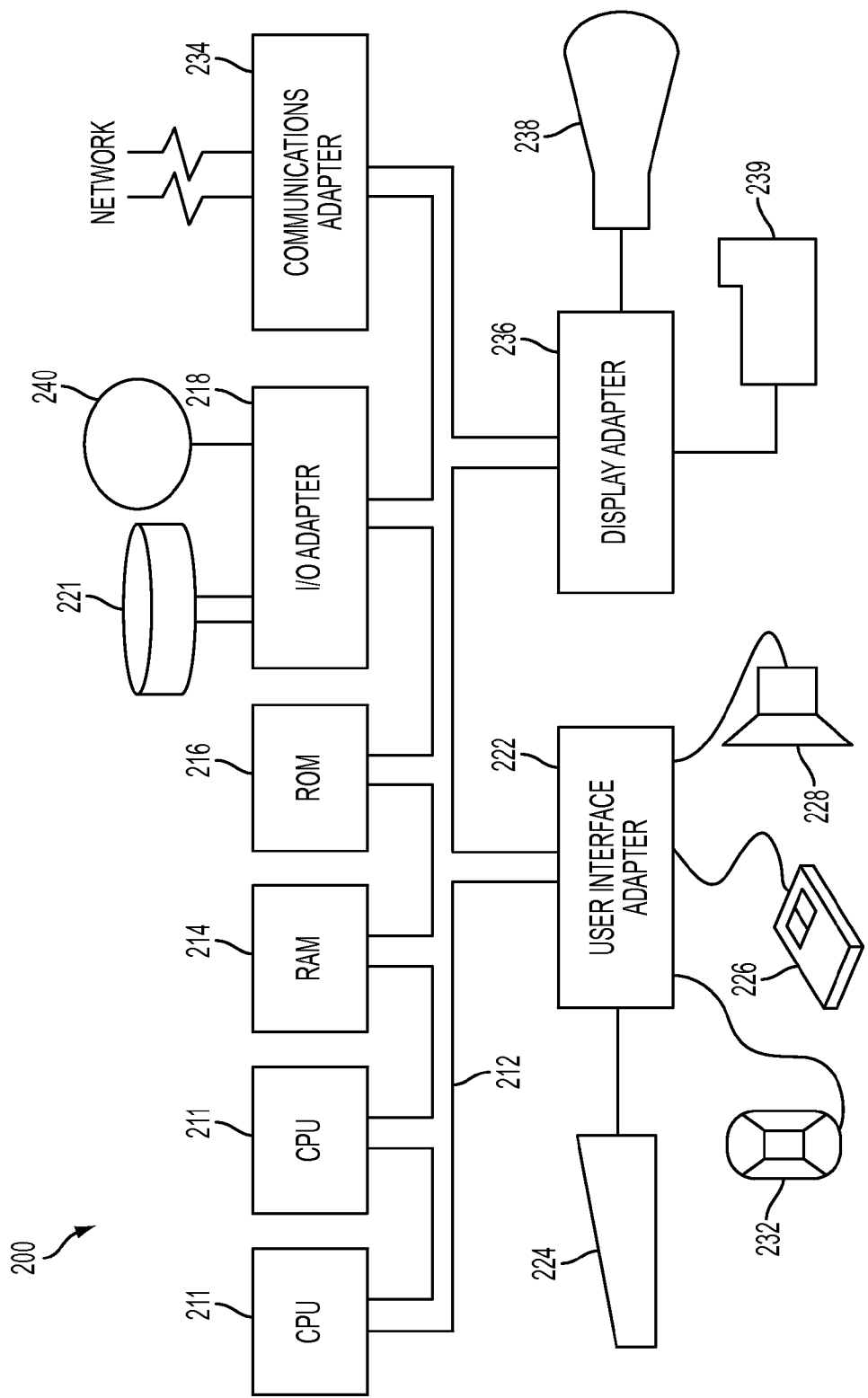
FIG. 2 depicts a block diagram of a system according to an embodiment of the present invention.

Referring now to FIG. 2, this FIG. shows a hardware configuration of computing system 200 according to an embodiment of the present invention. As seen, this hardware configuration has at least one processor or central processing unit (CPU) 211. The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communications adapter 234 for connecting the system 200 to a data processing network, the Internet, an Intranet, a local area network (LAN), etc., and a display adapter 236 for connecting the bus 212 to a display device 238 and/or printer 239 (e.g., a digital printer or the like).

Figure 3:
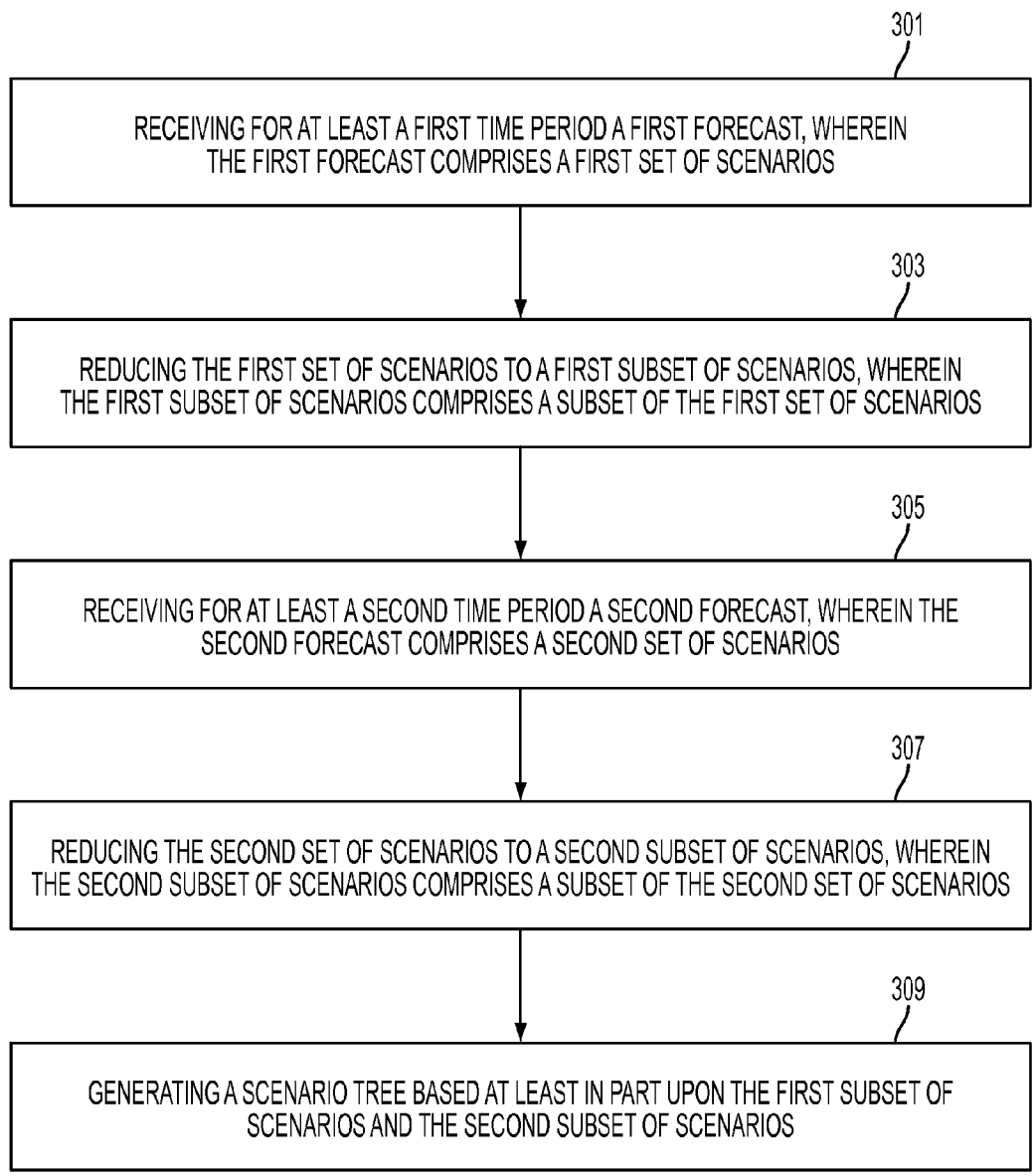
FIG. 3 depicts a flowchart according to an embodiment of the present invention.

Referring now to FIG. 3, a flowchart according to an embodiment of the present invention is shown. As seen, in this example, step 301 is receiving for at least a first time period a first forecast, wherein the first forecast comprises a first set of scenarios. Further, step 303 is reducing the first set of scenarios to a first subset of scenarios, wherein the first subset of scenarios comprises a subset of the first set of scenarios. Further, step 305 is receiving for at least a second time period a second forecast, wherein the second forecast comprises a second set of scenarios. Further, step 307 is reducing the second set of scenarios to a second subset of scenarios, wherein the second subset of scenarios comprises a subset of the second set of scenarios. Further, step 309 is generating a scenario tree based at least in part upon the first subset of scenarios and the second subset of scenarios.

Figure 4:
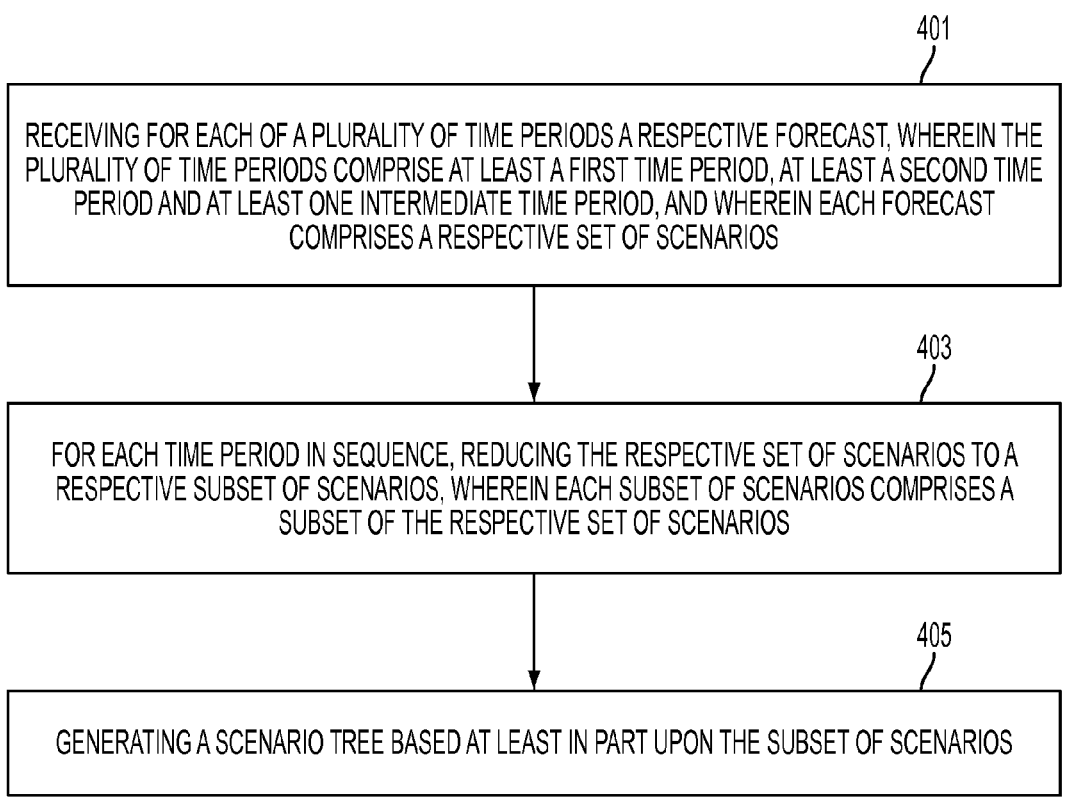
FIG. 4 depicts a flowchart according to an embodiment of the present invention.

Referring now to FIG. 4, a flowchart according to an embodiment of the present invention is shown. As seen, in this example, step 401 is receiving for each of a plurality of time periods a respective forecast, wherein the plurality of time periods comprise at least a first time period, at least a second time period and at least one intermediate time period, and wherein each forecast comprises a respective set of scenarios. Further, step 403 is for each time period in sequence, reducing the respective set of scenarios to a respective subset of scenarios, wherein each subset of scenarios comprises a subset of the respective set of scenarios. Further, step 405 is generating a scenario tree based at least in part upon the subset of scenarios.

In another example, various embodiments may relate to manufacturing operations (e.g., industrial). In another example, various embodiments may relate to energy distribution and intelligent utility networks (IUN). In another example, various embodiments may relate to the "Smarter Planet" area. In another example, various embodiments may relate to operations and manufacturing applications (e.g., software).

In another example, various embodiments may provide an E&U specific solution to ILOG. In another example, various embodiments may provide a differentiating solution for E&U for the "SmartGrid" area.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A system for providing scenario tree generation based at least in part upon scenario reduction, the system comprising one or more processor units configured for:

receiving for at least a first time period a first forecast, wherein the first forecast comprises a first set of scenarios;

reducing the first set of scenarios to a first subset of scenarios, wherein the first subset of scenarios comprises a subset of the first set of scenarios;

receiving for at least a second time period a second forecast, wherein the second forecast comprises a second set of scenarios;

reducing the second set of scenarios to a second subset of scenarios, wherein the second subset of scenarios comprises a subset of the second set of scenarios; and generating a scenario tree based at least in part upon the first subset of scenarios and the second subset of scenarios;

wherein the scenario tree has interperiod independency;

wherein the steps of reducing comprise applying an input $\Xi$ to an algorithm to produce an output $\tilde{\Xi}$; and wherein the algorithm comprises:

$$J^{*t} \leftarrow \underset{(\tilde{\xi}_1^t, \ldots, \tilde{\xi}_{n^t}^t) \in \mathbb{R}^{n^t}}{\operatorname{argmin}} \sum_{i=1}^{s} \min_{k=1\ldots n^t} p_i |\xi_i^t - \tilde{\xi}_k^t|,$$

$t = 1, \ldots, T.$ (i.e., $J^{*t}$ is the set of $n^t$ – medians of $\Xi^t$.)

$$I^t(j^t) \leftarrow \left\{ i^t \in I^t \,\middle|\, j^t \in \underset{k^t \in J^{*t}}{\operatorname{argmin}} \sum_{t=1}^{T} |\xi_{i^t} - \tilde{\xi}_{k^t}| \right\},$$

$j^t \in J^{*t}, t = 1, \ldots T.$ $j \leftarrow 0,$ for all $(j^1, \ldots, j^T) \in J^{*1} \times \cdots \times J^{*T}$ do $j \leftarrow j + 1,$ $\operatorname{support}(\tilde{\Xi}) \leftarrow \operatorname{support}(\tilde{\Xi}) \cup \{\tilde{\xi}_j\},$ $Pr(\tilde{\Xi} = \tilde{\xi}_j) = q_j$ $$= \sum_{i^1 \in I^1(j^1)} \cdots \sum_{i^T \in I^T(j^T)} Pr(\Xi = (\xi_{i^1}, \ldots, \xi_{i^T})),$$

end for $\tilde{S} \leftarrow j,$

-continued $$D_K(\Xi, \tilde{\Xi}) = \sum_{i=1}^{S} \min_{j=1,\ldots,\tilde{S}} \sum_{t=1}^{T} p_i |\xi_i^t - \tilde{\xi}_j^t|$$

$$= \sum_{i=1}^{S} \sum_{t=1}^{T} p_i |\xi_i^t - \tilde{\xi}_{j^t(i)}|$$

$$= \sum_{t=1}^{T} M^t(n^t).$$

2. The system of claim 1, further comprising applying the scenario tree to a stochastic unit commitment problem.

3. The system of claim 2, wherein the stochastic unit commitment problem relates to wind power generation.

4. The system of claim 3, wherein each of the first forecast and the second forecast comprises a forecast of wind speed.

5. The system of claim 1, wherein the steps are carried out in the order recited.

6. The system of claim 2, further comprising generating energy at a set of generators based upon the application of the scenario tree to the stochastic unit commitment problem.

7. The system of claim 6, further comprising generating the energy according to an optimal up and down schedule and corresponding generation amounts for the set of generators over a twenty-four-hour horizon.

8. The system of claim 7, further comprising generating the energy according to the optimal up and down schedule and the corresponding generation amounts for the set of generators over the twenty-four-hour horizon so that a total cost of generation and transmission is minimized.

9. The system of claim 8, further comprising generating the energy according to the optimal up and down schedule and the corresponding generation amounts for the set of generators over the twenty-four-hour horizon so that the total cost of generation and transmission is minimized and a set of constraints is observed.

10. The system of claim 1, wherein:

$\Xi = \{\xi_i\}_{i=1}^{S}, \xi_i \in \mathbb{R}^T$, with marginal distributions $\Xi^t = \{\xi_{i^t}\}_{i^t \in I^t}$, t=1, ..., T, $n^t \in \mathbb{N}$, t=1, ... T.

11. The system of claim 1, wherein:

$\tilde{\Xi} = \{\tilde{\xi}_j\}_{j=1}^{\tilde{S}}, \tilde{\xi}_j \in \mathbb{R}^T$, with marginal distributions $\tilde{\Xi}^t = \{\tilde{\xi}_{j^t}\}_{j^t \in J^t}$, $|J^t|=n^t$, t=1, ..., T.

12. A system for providing scenario tree generation based at least in part upon scenario reduction, the system comprising one or more processor units configured for:
  receiving for each of a plurality of time periods a respective forecast, wherein the plurality of time periods comprise at least a first time period, at least a second time period and at least one intermediate time period, and wherein each forecast comprises a respective set of scenarios;
  for each time period in sequence, reducing the respective set of scenarios to a respective subset of scenarios, wherein each subset of scenarios comprises a subset of the respective set of scenarios; and
  generating a scenario tree based at least in part upon the subset of scenarios;
  wherein the scenario tree has interperiod independency;
  wherein the steps of reducing comprise applying an input $\Xi$ to an algorithm to produce an output $\tilde{\Xi}$;

wherein the algorithm comprises:

$$J^{*t} \leftarrow \operatorname*{argmin}_{(\tilde{\xi}_1^t, \ldots, \tilde{\xi}_{n^t}^t) \in \mathbb{R}^{n^t}} \sum_{i=1}^{S} \min_{k=1\ldots n^t} p_i |\xi_i^t - \tilde{\xi}_k^t|,$$

$t = 1, \ldots, T.$ (i.e., $J^{*t}$ is the set of $n^t$ – medians of $\Xi^t$.)

$$I^t(j^t) \leftarrow \left\{ i^t \in I^t \,\middle|\, j^t \in \operatorname*{argmin}_{k^t \in J^{*t}} \sum_{t=1}^{T} |\xi_{i^t} - \tilde{\xi}_{k^t}| \right\}, j^t \in J^{*t},$$

$t = 1, \ldots T.$ $j \leftarrow 0,$ for all $(j^1, \ldots, j^T) \in J^{*1} \times \cdots \times J^{*T}$ do $j \leftarrow j + 1,$ $\tilde{\xi}_j = (\tilde{\xi}_{j^1}, \ldots, \tilde{\xi}_{j^T}),$ $\operatorname{support}(\tilde{\Xi}) \leftarrow \operatorname{support}(\tilde{\Xi}) \cup \{\tilde{\xi}_j\},$ $Pr(\tilde{\Xi} = \tilde{\xi}_j) = q_j$ $$= \sum_{i^1 \in I^1(j^1)} \cdots \sum_{i^T \in I^T(j^T)} Pr(\Xi = (\xi_{i^1}, \ldots, \xi_{i^T})),$$

end for $\tilde{S} \leftarrow j.$ $$D_K(\Xi, \tilde{\Xi}) = \sum_{i=1}^{S} \min_{j=1,\ldots,\tilde{S}} \sum_{t=1}^{T} p_i |\xi_i^t - \tilde{\xi}_j^t|$$

$$= \sum_{i=1}^{S} \sum_{t=1}^{T} p_i |\xi_i^t - \tilde{\xi}_{j^t(i)}|$$

$$= \sum_{t=1}^{T} M^t(n^t).$$

13. The system of claim 12, further comprising applying the scenario tree to a stochastic unit commitment problem.

14. The system of claim 13, wherein the stochastic unit commitment problem relates to wind power generation.

15. The system of claim 14, wherein each of the forecasts comprises a forecast of wind speed.

16. The system of claim 12, wherein the steps are carried out in the order recited.

17. The system of claim 12, wherein:

$\Xi = \{\xi_i\}_{i=1}^{S}, \xi_i \in \mathbb{R}^T$, with marginal distributions $\Xi^t = \{\xi_{i^t}\}_{i^t \in I^t}$, t=1, ..., T, $n^t \in \mathbb{N}$, t=1, ... T.

18. The system of claim 12, wherein:

$\tilde{\Xi} = \{\tilde{\xi}_j\}_{j=1}^{\tilde{S}}, \tilde{\xi}_j \in \mathbb{R}^T$, with marginal distributions $\tilde{\Xi}^t = \{\tilde{\xi}_{j^t}\}_{j^t \in J^t}$, $|J^t|=n^t$, t=1, ..., T.

19. A method for providing scenario tree generation based at least in part upon scenario reduction, the method comprising:
  receiving for at least a first time period a first forecast, wherein the first forecast comprises a first set of scenarios;
  reducing the first set of scenarios to a first subset of scenarios, wherein the first subset of scenarios comprises a subset of the first set of scenarios;

receiving for at least a second time period a second forecast, wherein the second forecast comprises a second set of scenarios;

reducing the second set of scenarios to a second subset of scenarios, wherein the second subset of scenarios comprises a subset of the second set of scenarios; and generating a scenario tree based at least in part upon the first subset of scenarios and the second subset of scenarios;

wherein the scenario tree has interperiod independency;

wherein the steps of reducing comprise applying an input $\Xi$ to an algorithm to produce an output $\tilde{\Xi}$; and wherein:

$$\Xi = \{\xi_i\}_{i=1}^{S}, \xi_i \in \mathbb{R}^T,$$

with marginal distributions $\Xi^t = \{\xi_{i^t}\}_{i^t \in I^t}$, t=1, ..., T, $n^t \in \mathbb{N}$, t=1, ..., T, $$\tilde{\Xi} = \{\tilde{\xi}_j\}_{j=1}^{\tilde{S}}, \tilde{\xi}_j \in \mathbb{R}^T,$$

with marginal distributions $\tilde{\Xi}^t = \{\tilde{\xi}_{j^t}\}_{j^t \in J^t}$, $|J^t| = n^t$, t=1, ..., T, and wherein the algorithm comprises:

$$J^{*t} \leftarrow \operatorname*{argmin}_{(\tilde{\xi}_1^t, \ldots, \tilde{\xi}_{n^t}^t) \in \mathbb{R}^{n^t}} \sum_{i=1}^{s} \min_{k=1 \ldots n^t} p_i |\xi_i^t - \tilde{\xi}_k^t|,$$

$t = 1, \ldots, T.$ (i.e., $J^{*t}$ is the set of $n^t$ − medians of $\Xi^t$.)

$$I^t(j^t) \leftarrow \left\{ i^t \in I^t \;\middle|\; j^t \in \operatorname*{argmin}_{k^t \in J^{*t}} \sum_{t=1}^{T} |\xi_{i^t} - \tilde{\xi}_{k^t}| \right\}, j^t \in J^{*t},$$

$t = 1, \ldots T.$ $j \leftarrow 0,$ for all $(j^1, \ldots, j^T) \in J^{*1} \times \cdots \times J^{*T}$ do $j \leftarrow j + 1,$ $\tilde{\xi}_j = (\tilde{\xi}_{j^1}, \ldots, \tilde{\xi}_{j^T}),$ $\operatorname{support}(\tilde{\Xi}) \leftarrow \operatorname{support}(\tilde{\Xi}) \cup \{\tilde{\xi}_j\},$ $Pr(\tilde{\Xi} = \tilde{\xi}_j) = q_j$ $$= \sum_{i^1 \in I^1(j^1)} \cdots \sum_{i^T \in I^T(j^T)} Pr(\Xi = (\xi_{i^1}, \ldots, \xi_{i^T})),$$

end for $\tilde{S} \leftarrow j.$ $$D_K(\Xi, \tilde{\Xi}) = \sum_{i=1}^{S} \min_{j=1,\ldots,\tilde{S}} \sum_{t=1}^{T} p_i |\xi_i^t - \tilde{\xi}_j^t|$$

$$= \sum_{i=1}^{S} \sum_{t=1}^{T} p_i |\xi_i^t - \tilde{\xi}_{j^t(i)}^t|$$

$$= \sum_{t=1}^{T} M^t(n^t).$$

20. The method of claim 19, wherein the steps are carried out in the order recited.

21. An article of manufacture, comprising:

at least one non-transitory computer usable device having a computer readable program code logic tangibly embodied therein to execute at least one machine instruction in a processing unit for providing scenario tree generation based at least in part upon scenario reduction, said computer readable program code logic, when executing, performing the following steps:

receiving for at least a first time period a first forecast, wherein the first forecast comprises a first set of scenarios;

reducing the first set of scenarios to a first subset of scenarios, wherein the first subset of scenarios comprises a subset of the first set of scenarios;

receiving for at least a second time period a second forecast, wherein the second forecast comprises a second set of scenarios;

reducing the second set of scenarios to a second subset of scenarios, wherein the second subset of scenarios comprises a subset of the second set of scenarios; and generating a scenario tree based at least in part upon the first subset of scenarios and the second subset of scenarios;

wherein the scenario tree has interperiod independency;

wherein the steps of reducing comprise applying an input $\Xi$ to an algorithm to produce an output $\tilde{\Xi}$; and wherein:

$$\Xi = \{\xi_i\}_{i=1}^{S}, \xi_i \in \mathbb{R}^T,$$

with marginal distributions $\Xi^t = \{\xi_{i^t}\}_{i^t \in I^t}$, t=1, ..., T, $n^t \in \mathbb{N}$, t=1, ..., T, $$\tilde{\Xi} = \{\tilde{\xi}_j\}_{j=1}^{\tilde{S}}, \tilde{\xi}_j \in \mathbb{R}^T,$$

with marginal distributions $\tilde{\Xi}^t = \{\tilde{\xi}_{j^t}\}_{j^t \in J^t}$, $|J^t| = n^t$, t=1, ..., T, and wherein the algorithm comprises:

$$J^{*t} \leftarrow \operatorname*{argmin}_{(\tilde{\xi}_1^t, \ldots, \tilde{\xi}_{n^t}^t) \in \mathbb{R}^{n^t}} \sum_{i=1}^{s} \min_{k=1 \ldots n^t} p_i |\xi_i^t - \tilde{\xi}_k^t|,$$

$t = 1, \ldots, T.$ (i.e., $J^{*t}$ is the set of $n^t$ − medians of $\Xi^t$.)

$$I^t(j^t) \leftarrow \left\{ i^t \in I^t \;\middle|\; j^t \in \operatorname*{argmin}_{k^t \in J^{*t}} \sum_{t=1}^{T} |\xi_{i^t} - \tilde{\xi}_{k^t}| \right\}, j^t \in J^{*t},$$

$t = 1, \ldots T.$ $j \leftarrow 0,$ for all $(j^1, \ldots, j^T) \in J^{*1} \times \cdots \times J^{*T}$ do $j \leftarrow j + 1,$ $\tilde{\xi}_j = (\tilde{\xi}_{j^1}, \ldots, \tilde{\xi}_{j^T}),$ $\operatorname{support}(\tilde{\Xi}) \leftarrow \operatorname{support}(\tilde{\Xi}) \cup \{\tilde{\xi}_j\},$ $Pr(\tilde{\Xi} = \tilde{\xi}_j) = q_j$ $$= \sum_{i^1 \in I^1(j^1)} \cdots \sum_{i^T \in I^T(j^T)} Pr(\Xi = (\xi_{i^1}, \ldots, \xi_{i^T})),$$

end for $\tilde{S} \leftarrow j.$

-continued $$D_K(\Xi, \hat{\Xi}) = \sum_{i=1}^{S} \min_{j=1,\dots,\tilde{S}} \sum_{t=1}^{T} p_i |\xi_i^t - \tilde{\xi}_j^t|$$

$$= \sum_{i=1}^{S} \sum_{t=1}^{T} p_i |\xi_i^t - \tilde{\xi}_{j^t(i)}|$$

$$= \sum_{t=1}^{T} M^t(n^t).$$

22. The article of manufacture of claim 21, wherein the steps are carried out in the order recited.

\* \* \* \* \*